United States Patent Office 3,348,623
Patented Oct. 24, 1967

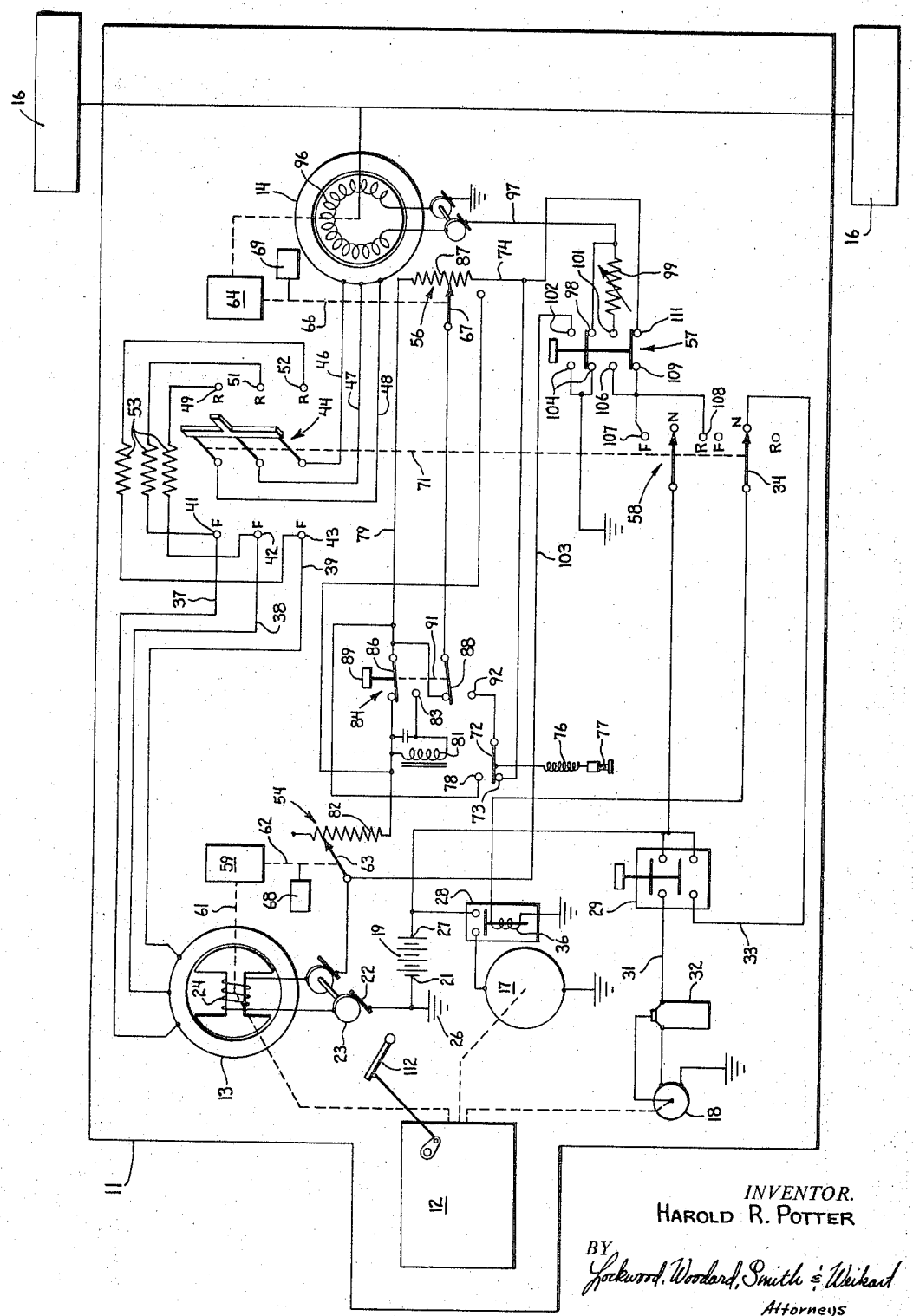

3,348,623
AUTOMATIC ELECTRIC DRIVE SYSTEM
Harold R. Potter, Walnut Heights Addition, Rte. 4,
Bedford, Ind. 47421
Filed Oct. 14, 1964, Ser. No. 403,750
13 Claims. (Cl. 180—65)

ABSTRACT OF THE DISCLOSURE

An engine-driven generator supplying power to a vehicle drive motor through manually operable direction control switch. An exciter circuit for the generator having a first resistance therein responsive to generator speed for changing the resistance in the exciter circuit, and a second variable resistance in the exciter circuit but responsive to motor speed to vary the resistance in the exciter circuit in accordance with motor speed changes. A manually-operable switch for shunting the generator exciter winding and providing an exciter circuit for the motor for engine braking and push-starting of the engine, when needed.

Background and description

This invention relates generally to electric drive systems for land, water, and air vehicles, and more particularly to a drive system employing drive motors and a generator supplying current to the drive motors, the generator being driven by an internal combustion engine or turbine or other fuel burning engine.

In various types of vehicles, and particularly those which operate on land at continuously varying speeds and under continuously varying road conditions, efficient powerful drive systems are quite desirable. Systems employing engines, generators and motors are well known and widely used. In such systems, it is desirable to be able to obtain at the drive wheels, the optimum combination of torque and speed to obtain the type of vehicle action desired by the operator.

It is therefore the general object of the present invention to provide an improved drive system adapted to a variety of vehicles.

A further object is to provide a drive system employing an engine, generator, and drive motor or motors wherein the torque and speed and thereby the power transferred from the generator to the drive motor is better controlled to meet operating conditions.

A further object is to provide an arrangement useful in alternating current or direct current applications.

Described briefly, a typical embodiment of the present invention employs a generator in which the exciter circuit includes a variable resistance controlled by a speed responsive member connected to the rotor of the generator. The arrangement is such that the increase of rotor speed results in a decrease of resistance in the exciter circuit.

The exciter circuit also includes in series a variable resistance which is varied by a second speed responsive device. This second speed responsive device is connected to the vehicle drive motor and decreases the amount of the second resistance as drive motor speed increases. These features, together with auxiliary apparatus, provide optimum excitation in the generator to meet all operating conditions.

The full nature of the invention will be understood from consideration of the following description in view of the drawing wherein is shown a schematic diagram of a typical embodiment of the present invention.

Referring now to the drawing in detail, the vehicle 11 includes a prime mover which may be fuel burning engine 12, for example. An alternating current generator 13 is directly connected to and driven by the engine, and a drive motor 14 is directly connected to the power output means of the vehicle, which in this example, are shown as road wheels 16. In this example, the engine 12 is equipped with a starter motor 17 and a distributor 18 and may be considered to be a spark-ignition gasoline-burning internal combustion engine.

The vehicle has a storage battery 19 having a negative terminal 21 connected through a brush 22 and rotor mounted slip ring 23 to one end of the exciter winding 24 of the generator. This terminal 21 is also connected to a ground 26 in the vehicle. The positive terminal 27 of the battery is connected also to the engine starter motor solenoid assembly 28, and to the combination ignition-start switch 29, the latter of which has an ignition coil 32 and distributor breaker points (not shown) returned back to ground, in conventional manner. The switch assembly 29 also includes a starter solenoid terminal 33 connected through a neutral switch 34 back to the starter solenoid winding 36 which is returned to ground. These various connections providing for the ignition and starting functions for the engine 12 are conventional, and variations according to conventional practices may be employed. The neutral switch 34 is also conventional practice, but the operation thereof by a vehicle direction selector is accompanied by operation of several other switches according to the present invention, in a manner which will be described hereinafter.

The generator produces a three-phase output on the lines 37, 38, and 39 which are connected to the "forward drive" terminals 41, 42, and 43, respectively, of the triple-pole double-throw vehicle direction control power switch 44, which is shown in a neutral position. The three output lines, 46, 47 and 48 from this switch are connected to the three-phase motor 14. Three "reverse drive" terminals 49, 51, and 52 are also provided in the switch 44, they being connected to the forward terminals through ballast resistors 53, the connection being such as to reverse the polarity on two of the three lines to the motor 14, when the movable contacts of the switch are moved from the forward terminals to the reverse terminals.

According to the present invention, the exciter circuit for the generator 13 includes the battery 19, the exciter coil 24, a first variable resistance means 54 and a second variable resistance means 56, a manual throw-out switch 57 and a second neutral switch 58, the latter of which is returned to the battery. Further according to my invention, a speed responsive actuator 59 is connected to the rotor of the generator 13 as indicated by the dotted line 61 and is connected by an output member 62 to the adjustable wiper 63 of the variable resistance means 54, which may be a large rheostat or potentiometer, for example. The operation is such that as the rotor speed increases, the series resistance included in the exciter circuit by the variable resistance means 54 is decreased.

Similarly, according to my invention, a speed responsive actuator 64 is connected to the rotor of the output drive motor 14, and this actuator has an output member 66 connected to the adjustable wiper 67 of the variable resistance means 56. The action of the speed responsive means here also is to decrease the series resistance in the exciter circuit which is provided by the variable resistance means 56, as motor speed increases.

Further according to my invention, an inertia adder 68 is coupled to the adjustable member of variable resistance means 54 and an inertia adder 69 is similarly coupled to the adjustable member 67 of the resistance means 56. These devices, which, in their simplest forms may be two directional dashpots, oppose excessively rapid changes of resistance which might otherwise result from comparatively rapid speed changes.

It is to be noted that the two neutral switches and the direction selector switch 44 are all connected together as indicated by the dotted line 71, so that they are operated in unison and so that all of them are in the forward position together and all in the neutral position together and all in the reverse position together.

A current adjusting relay means is provided in the exciter circuit. This includes an electrically operated switch, the movable contactor 72 of which is normally closed with a fixed contact 73 which is connected to the conductor 74 in the exciter circuit. A spring 76 is connected to the movable contactor 72 and is adjustable by the adjustment screw 77, to increase or decrease the force required to break contact with terminal 73 and make a connection with the contact 78, the contact 78 being connected to the conductor 79.

The operating coil 81 for the current adjusting relay has one end connected to the lower end of the resistance 82 in the adjustable resistance means 54 and has the other end connected to the fixed contact 83 of the relay activating switch 84 which is shown in a position disabling the current adjusting relay. This switch 84 includes the movable contactor 86 normally making a direct connection from the lower end of resistor 82 to the upper end of the resistor 87 in the variable resistance means 56. This switch 84 also includes a movable contactor 88 which is connected to the adjustable wiper 67 of variable resistance means 56. Normally, when the switch means 84 is disabling the current adjusting relay, the movable contactor 88 thereof is connected directly to the conductor 79.

The button 89 can be depressed to place the movable contactor 86 in connection with the fixed contactor 83 to make a circuit through the operating coil 81 for the electrically operated switch. Because of the mechanical connection between the movable contactor 86 and the movable contactor 88, which connection is indicated by the dotted line 91, depression of the button 89 also places the movable contactor 88 into contact with the fixed contactor 92, thus connecting the electrically operated movable switch contactor 72 to the adjustable wiper 67 of the variable resistance means 56.

There is also provided according to my invention, a circuit arrangement for push starting and engine braking where the invention is to be employed with land vehicles. For these purposes, the motor 14 employs a wound rotor 96, one end of the rotor winding being connected through a brush and slip ring to ground, and the other end of the rotor winding being connected through a brush and slip ring and the conductor 97 to a fixed contactor 98 of the manual throw-out switch 57. Conductor 97 is also connected through a variable calibrating resistor 99 to a fixed contactor 101 of the manual throw-out switch.

A fixed contactor 102 of the manual throw-out switch is connected through the conductor 103 to the movable member 63 of the variable resistance means 54. The fixed contactors 104 of the manual throw-out switch are permanently connected to ground and fixed contactor 106 is connected to the fixed contactors 107 and 108 of the second neutral switch 58. Normally, when the manual throw-out switch 57 is in the throw-in condition shown, the contactors 98 and 104 are bridged by a bridging contactor of the switch which grounds both ends of the wound rotor of the drive motor. Also the fixed contactors 109 and 111 are bridged to complete a path from the conductor 74 in the exciter circuit to the two contacts 107 and 108 of the second neutral switch 58.

*Operation*

In the operation of the present invention, the vehicle engine is started in the usual manner by actuation of the ignition-start switch 29, which is effective to start the engine in the conventional manner. The manual throw-out switch 57 is in the throw-in condition wherein the fixed contactors 98 and 104 thereof are bridged as are the fixed contactors 111 and 109 thereof. The current adjusting relay control switch 84 may be considered in the "out" condition and the direction selector switch 44 is in the neutral condition, this being a requirement in order to start the engine. Engine speed is determined in conventional manner by the accelerator pedal 112.

As soon as the engine is started, the idling speed thereof causes slightly less than the maximum resistance of the means 54 to be included in the exciter circuit. Maximum resistance in the means 56 is in series in the exciter circuit because the drive motor speed is zero. To drive the vehicle forward, the direction selector switch 44 is moved to place the movable switch contacts in contact with the forward drive terminals 41, 42, and 43, making the proper connection from the generator to the drive motor. Then, as the accelerator pedal 112 is depressed to increase engine speed, the generator rotor speed increases which decreases the portion of resistance 54 in the exciter circuit, allowing more current to flow in the exciter circuit. As the voltage in the lines 37, 38, and 39 thereby increases, the drive motor 14 will normally begin to rotate. As it does, and the speed thereof increases, the portion of resistance 56 in the exciter circuit decreases. As the generator and motor speeds continue to increase, the exciter circuit resistance in the generator continues to decrease.

Operation in reverse is precisely the same, except for the fact that the addition of the ballast resistors 53 prevents excessive speeds in reverse.

The arrangement of the variable resistance means 54 and the actuator therefor is such that the portion of the resistance thereof in the exciter circuit is reduced to zero when the engine has reached optimum engine speed, this being the speed at which the maximum horsepower output of the engine is attainable. It need not be and usually is not as high as the maximum speed of the engine.

In some instances, it may be desirable for the resistance added by the variable resistance means 56 to decrease as the motor speed decreases. For this purpose the current adjusting relay is provided. To achieve this result it is necessary to push the button 89 down, which places the movable contactor 86 in connection with the fixed contact 83 and the movable contactor 88 in connection with fixed contact 92. Then, so long as the movable contactor 72 remains closed with fixed contactor 73, the portion of the resistor 87 below the point of contact by the wiper 67 will be shorted out and the current flowing through the operating coil 81 will be determined by the active resistance in resistor means 54 and by the portion of the resistor 87 above the movable wiper 67. Therefore, as speed decreases, the wiper moves up toward the upper end of resistor 87 and when it reaches the upper end, the resistor is completely shunted through the arm 86, fixed contact 92, and arm 72 and fixed contact 73.

When the current reaches a certain maximum level, as determined by the adjustment screw 77, the exciter current in the coil 81 will pull the contactor 72 away from fixed contact 73 and into contact with fixed contact 78. This immediately throws the full resistance 87 into the exciter circuit, thereby limiting the attainable current in the exciter circuit. Immediately the current drops so that the coil 81 is no longer able to hold the member 72 against the fixed contact 78 whereupon it returns to again shunt the resistance 87 through the fixed contactor 73. In this way, the amount of current in the generator exciter winding when the motor is at slow speed or stationary, is limited, so that neither the generator nor motor becomes electrically over-loaded.

Means are also provided according to this invention to enable reverse braking and push starting of the engine 12. For this purpose, the motor 14 is provided with a wound rotor and the manual throw-out switch assembly 57 is used. This switch is raised from the normal position shown, so that the contacts 102 and 104 are bridged and the contacts 101 and 106 are bridged. Because contact 102 is connected through the line 103 to the slip ring at the ungrounded end of the generator, and because the contact 104 of the throw-out switch is grounded, the exciter winding of the generator is then grounded and will serve, in effect, as a squirrel cage rotor. Thus the usual generator exciter circuit is de-activated. Instead, the wound rotor of the motor is energized through the bridged contacts 106 and 101 and through the calibration resistor 99, which is a variable resistor, and thence to ground through the slip rings and brushes of the motor. Therefore, when the car is pushed, or the car is coasting downhill, the motor 14 will act as a generator tending to drive the generator 13 which is now acting as a motor. Generator 13, being coupled to the engine 12 directly, tends to drive the engine which resists being driven thereby, and the result is to obtain engine braking in the case of a downhill coast or engine rotation in the case of an effort to start the engine by pushing the vehicle.

From the foregoing description, it should be apparent that a variety of arrangements would come within the scope of the present invention. Therefore, while the invention has been disclosed and described in some detail in the drawings and the foregoing description, they are to be considered as illustrative and not restrictive in character, and other modifications may readily suggest themselves to persons skilled in this art and within the broad scope of the invention, reference being had to the appended claims.

The invention claimed is:

1. An automatic electric drive system comprising:
   a fossil fuel burning electrical ignition internal combustion engine having an output shaft and having a controller manually operable to control the fuel burning rate and thereby control the power output of the engine available on said engine output shaft, said engine having an electrical starting circuit;
   a storage battery source of direct current electrical energy;
   an electrical generator having a rotor connected to and driven by said output shaft, said generator having an exciter winding therein and having load current output terminals thereon;
   a drive motor having power input terminals thereon and having a motor output shaft and having an exciter winding thereon;
   vehicle propelling road wheels connected to said motor output shaft and driven thereby;
   a triple-pole, double-throw power switch connecting the power output terminals of said generator to the power input terminals of said motor, the connection of said switch to said terminals being effective to cause forward operation of said motor when said switch is in a first position, disconnect said motor terminals from said generator terminals when said switch is in a second position intermediate said first position and a third position, and cause reverse operation of said motor when said switch is in said third position, with ballast resistance means coupled between certain contactors of said switch and certain other contactors of said switch to reduce the voltage applied to said motor terminals during reverse operation thereof;
   an exciter circuit for said generator, said exciter circuit including in series said exciter winding, said battery, a first variable resistance means, a second variable resistance means, and a manually operable switch;
   a first speed responsive actuator connected to the rotor of said generator and having an output member connected to said first variable resistance means, said actuator being responsive to increased speeds of said generator rotor to decrease the series resistance of said first variable resistance in said exciter circuit;
   and a second speed responsive actuator connected to the output shaft of said motor and having an output member connected to said second variable resistance means, said second speed responsive actuator means being responsive to increased speeds of said motor output shaft to decrease the resistance of said second resistance means in said exciter circuit.

2. A system as set forth in claim 1 and further comprising simulated inertia adding means connected to one of said actuator output members to control the speed response of the variable resistance means operated thereby.

3. The system as set forth in claim 2 wherein said manually operable switch is connected to said power switch and is operable to close said exciter circuit when said power switch is in said first position and said third position and open said exciter circuit when said power switch is in a position other than said first and third positions.

4. A system as set forth in claim 3 wherein a second manually operable switching means is disposed in said exciter circuit, said second manually operable switching means being normally disposed in a first condition completing said exciter circuit through a first set of normally closed contacts, and shorting the exciter winding of said motor through a second set of normally closed contacts, said second switching means having a second operating condition closing a first set of normally open contacts thereof, thereby completing a series circuit including said battery and said exciter winding of said motor and a variable resistor to provide a motor exciter circuit, said second manually operable switch having a second set of normally open contacts operable when said second switch is in second condition, to close and short said exciter winding of said generator, whereby the driving of said motor by a power input thereto derived from said road wheels supplies power to said generator driving said generator and driving said engine thereby.

5. The system set forth in claim 4 and further comprising a manually operable neutral switch in the said electrical starting circuit for said engine, said neutral switch being connected to said power switch and thereby movable to close only when said power switch is in said second position.

6. A system as set forth in claim 5 and further comprising current adjusting relay means including:
   a third manually operable switch in said generator exciter circuit, said switch being movable from a first position directly connecting said first variable resistance means to said second variable resistance means, to a second position connecting said first variable resistance means to said second variable resistance means through the operating coil of an electrically operable switch, and a fourth manually operable switch connected to said third switch and operable therewith and normally connected between one end of a resistor in said second variable resistance means and a movable wiper of said second resistance means, and said fourth switch being movable to a second position when said third switch is in said second position thereof to disconnect the movable wiper of said second resistance means from the one end of the resistor therein and connect said wiper through a movable contactor and a normally-closed fixed contactor of said electrically operable switch to the opposite end of said resistor of said second resistance means, said fourth switch thereby effectively reversing the polarity of said second resistance means so as to increase the effective resistance thereof in said generator exciter circuit as the speed of said motor increases;
   said electrically operable switch having a normally-open fixed contact connected to said one end of said resistor of said second resistance means;

an adjustable spring biasing means normally holding the movable contactor of said electrically operated switch in contact with the normally-closed fixed contactor thereof to maintain the polarity reversal condition when said fourth switch is in said second position, said adjustable means being adjustable to enable said operating coil to break the contact between the movable contactor of said electrically op-operable switch and the normally-closed fixed contactor thereof and make a connection between the movable contactor thereof and the normally-open fixed contactor thereof when current in said generator exciter circuit exceeds a predetermined value, for temporary application of the entire resistance of said resistor of said second resistance means in series in said generator exciter circuit to reduce the current therein.

7. An automatic electric drive system comprising:
a prime mover having an output shaft and having a manually operable power output controller, said controller being operable to vary the power output available on said output shaft;
a source of direct current electrical energy;
an electrical generator having a rotor connected to and driven by said output shaft, said generator having exciter means therein and having load current power output means therein;
a drove motor having power input terminals thereon and having a power output shaft;
power switching means connecting the power output means of said generator to the power input terminals of said motor;
an exciter circuit for said generator, said exciter circuit including said exciter means, said source of electrical energy, a first variable resistance means, a second variable resistance means, and a manually operable switch;
a first speed responsive actuator connected to the rotor of said generator and having an output member connected to said first variable resistance means, said actuator being responsive to increased speeds of said generator rotor to decrease the series resistance of said first variable resistance means in said exciter circuit;
and a second speed responsive actuator means connected to the output shaft of said motor and having an output member connected to said second variable resistance means, said second speed responsive actuator means being responsive to increased speeds of said motor output shaft to decrease the resistance of said second resistance means in said exciter circuit.

8. A system as set forth in claim 7 and further comprising simulated inertia adding means connected to one of said actuator output members to control the response of the variable resistance means operated thereby.

9. The system as set forth in claim 7 wherein: said power switching means are operable in a first position to effect forward operation of said drive motor, and in a second position to disconnect said drive motor from said generator, and in a third position to effect reverse operation of said drive motor; and said manually operable switch is connected to said power switching means and is operable to close said exciter circuit when said power switching means are in said first position and said third position and open said exciter circuit when said power switching means are in a position other than said first and third positions.

10. A system as set forth in claim 7 wherein: a second manually operable switching means is disposed in said exciter circuit, said second manually operable switching means being normally disposed in a first condition completing said exciter circuit and having a second operating condition completing a circuit through said battery and through an exciter winding of said motor to provide a motor exciter circuit, said second manually operable switch being operable when in second condition, to close a shunting circuit through said exciter means of said generator, whereby the driving of said motor by a power input thereto through said output shaft thereof supplies power to said generator, driving said generator and driving said prime mover set thereby.

11. A system as set forth in claim 7 and further comprising current adjusting relay means including:
a second manually operable switch in said generator exciter circuit, said switch being movable from a first position directly connecting said first variable resistance means to said second variable resistance means, to a second position connecting said first variable resistance means to said second variable resistance means through the operating coil of an electrically operable switch, and a third manually operable switch connected to said second switch and operable therewith and normally connected between one end of a resistor in said second variable resistance means to a movable wiper of said second resistance means, and said third switch being movable to a second position when said second switch is in said second position thereof to disconnect the movable wiper of said second resistance means from the one end of the resistor therein and connect said wiper through an electrically movable contactor and a normally-closed fixed contactor of said electrically operable switch to the opposite end of said resistor of said second resistor means, said third switch thereby effectively reversing the polarity of said second resistance means so as to increase the effective resistance thereof in said generator exciter circuit as the speed of said motor increases;
said electrically operable switch having a second normally-open fixed contact connected to said one end of said resistor of said second resistance means;
an adjustable spring biasing means normally holding the movable contactor of said electrically operated switch in contact with the normally-closed fixed contactor thereof to maintain the polarity reversal condition when said third switch member is in said second position, said adjustable means being adjustable to enable said operating coil to break the contact between the movable contactor of said electrically operable switch and the normally-closed fixed contactor thereof and make a connection between the movable contactor thereof and the normally-open fixed contactor thereof when current in said generator exciter circuit exceeds a predetermined value.

12. An automatic electric drive system comprising:
a prime mover having an output shaft and having a manually operable output controller, said controller being operable to vary the power output available on said output shaft;
a source of direct current electrical energy;
an electrical generator having a rotor connected to and driven by said output shaft, said generator having exciter means therein and having load current power output means therein;
a vehicle drive motor having power input terminals thereon and having a power output shaft;
power switching means connecting the power output means of said generator to the power input terminals of said motor;
an exciter circuit for said generator, said exciter circuit including said exciter means, said source of electrical energy, and a variable resistance means;
speed responsive actuator means coupled to said generator and to said vehicle drive motor and having output members connected to said variable resistance means and responsive to speed increases of said generator and to speed increases of said motor to decrease the resistance in said exciter circuit.

13. The combination set forth in claim 12 and further comprising:

current control means in said exciter circuit and responsive to currents in said exciter circuit above a predetermined level to increase resistance in said exciter circuit until the current therein has again returned to said predetermined level, whereby excessive currents in said exciter circuit are avoided.

References Cited

UNITED STATES PATENTS

| | | | |
|---|---|---|---|
| 1,850,734 | 3/1932 | Thorne | 290—16 X |
| 2,265,931 | 12/1941 | Tarbox et al. | 290—17 |
| 2,266,312 | 12/1941 | Dilworth | 290—17 |
| 2,300,946 | 11/1942 | Liwschitz | 318—148 |
| 2,336,052 | 12/1943 | Anderson et al. | 318—158 X |
| 2,454,778 | 11/1948 | Curry | 318—148 X |
| 2,581,596 | 1/1952 | Nims | 180—65 |

FOREIGN PATENTS

| | | |
|---|---|---|
| 414,344 | 1934 | Great Britain. |
| 582,359 | 11/1946 | Great Britain. |

BENJAMIN HERSH, *Primary Examiner.*

MILTON L. SMITH, *Examiner.*